United States Patent [19]

Gaus et al.

[11] Patent Number: 5,115,367
[45] Date of Patent: May 19, 1992

[54] RIGHT ANGLE PLUG

[76] Inventors: Harry Gaus, Schwanheimer Strasse 93, 6140 Bensheim; Gunter Schliebs, Claudiusweg 17A, 6100 Darmstadt; Hagen Gross, Am Zollstock 29, 6380 Bad Homburg, all of Fed. Rep. of Germany

[21] Appl. No.: 392,726

[22] Filed: Aug. 2, 1989

[30] Foreign Application Priority Data

Aug. 4, 1988 [DE] Fed. Rep. of Germany ....... 3826462

[51] Int. Cl.⁵ ............................................. H02H 3/16
[52] U.S. Cl. ...................................... 361/49; 361/50; 307/118
[58] Field of Search ...................... 361/49, 50, 42, 104; 307/118, 326

[56] References Cited

U.S. PATENT DOCUMENTS

| | | | |
|---|---|---|---|
| 4,589,047 | 5/1986 | Gaüs et al. | 361/42 |
| 4,751,603 | 6/1988 | Kwan | 361/50 |

Primary Examiner—Todd E. DeBoer

[57] ABSTRACT

A protective device for portable apparatus supplied from a high-voltage line is disclosed, which includes a connecting line from an electrical supply. The device also includes a protective switch with contact sets located in the supply lines and pre-stressed contact springs which are maintained in a closed position by a hoop-like fusible wire. An electronic firing circuit is disposed on a flat plate, together with the protective switch and the connections to the supply line and to the apparatus. The two-pole outlet of the firing circuit terminates in contact lugs with which the ends of the fusible wire can be connected mechanically and electrically. The circuit plate is, preferably, seated in the housing of a right angle plug, the contact pins of which are cast or pressed into the bottom of the housing and support the circuit plate while, at the same time, their heads constitute the opposite contact for the contact springs of the protective switch.

20 Claims, 2 Drawing Sheets

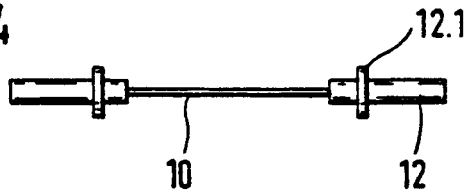
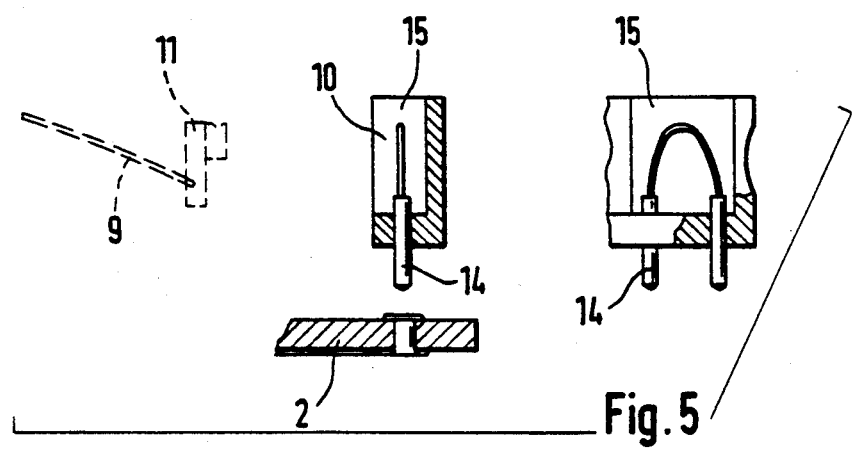
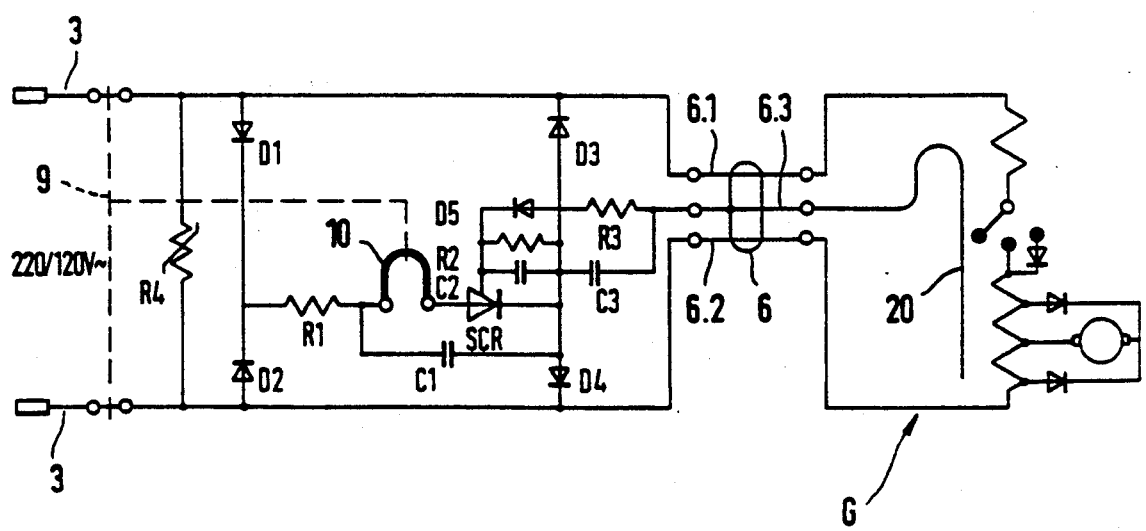
Fig.6

RIGHT ANGLE PLUG

BACKGROUND OF THE INVENTION

1. Technical Field of the Invention

The present invention relates to a protective device for electrically operated equipment. More particularly, the present invention relates to protective device for electrically operated equipment, particularly equipment of a portable nature, which is fed from a power line and through a power cord connection.

2. Description of the Prior Art

Protective devices of the type to which the present invention is directed are those intended to protect equipment which can be used in the workplace or in households in damp areas, especially bathrooms. Additional uses for such protective devices are, for example, uses in connection with immersion pumps, air-bubble massage equipment (e.g., DE 26 31 785), kitchen equipment, hair dries (e.g., European Patent Application No. 1831), forced-air heaters or irradiation lamps, and the protection of such devices against damage by water and to further protect their users against receiving an electrical shock.

Such protective devices can either be installed in the electrical equipment itself, as shown in European Patent No. 88,390 (which corresponds to U.S. Pat. No. 4,589,047), in the plug of its power cord, as shown in European Patent Application No. 1831 and DE 26 31 785, or in an intermediate plug, as described in DE 25 39 279. In the latter case, it is possible to introduce the protection into an item without changing the design of the equipment.

As opposed to protective devices which use holding-current relays to disconnect the line current in the event of danger, and where is it therefore possible to switch the power on again as soon as the disturbance has been eliminated, the protective devices of the type known to the prior art, to which the present invention is directed, require that once a dangerous incident has occurred, i.e., the firing circuit has responded and has thrown the protective switch, that the power cord of the equipment—including the power plug—or at least the intermediate plug, must be replaced.

SUMMARY OF THE INVENTION

It is, therefore, an object of the present invention to provide a protective apparatus for electrical equipment which is capable of reuse after activation.

It is a further object of the present invention to provide a protective apparatus for electrical equipment which is simple to manufacture.

The foregoing and related objects are achieved in accordance with the present invention by a protective device which includes:

an automatic-opening mechanical protective switch with two sets of contacts in the power leads of the power cord plug, said sets of contacts having prestressed contact springs which are held in closed state with contact rods by said fusible wire;

an electronic firing circuit having a two-pole output with contact lugs to which said fusible wire is electrically and mechanically connectable; and, said electronic firing circuit being arranged on said circuit board together with said protective switch in the housing of said power cord plug.

An advantage of the present invention over protective devices of the prior art resides in the fact that fusible wires can be held in reserve, such as fine fuse wires, and that a protective switch, once it has been activated, can be made ready for use once again without the need for costly equipment or repair. The replacement of electrical installation parts, such as the power cord, is eliminated.

In a particularly preferred embodiment of the present invention, the protective device of the present invention is manufactured as an angled plug, as described in greater detail hereinafter, owing to its low cost, small number of parts and overall simplicity from a manufacturing technology viewpoint as compared to the prior art, e.g., U.S. Pat. No. 4,589,047.

Other objects and features of the present invention will become apparent to those skilled in the art when the present invention is considered in view of the accompanying drawing figures. It should, of course, be recognized that the accompanying drawing figures illustrate a preferred embodiment of the present invention and are not intended as a means for defining the limits and scope of the present invention.

BRIEF DESCRIPTION OF THE DRAWING

In the drawing figures, wherein similar reference numerals denote similar features throughout the several views:

FIG. 1 shows a plan view of the opened plug housing; and,

FIG. 2 shows a longitudinal section through the plug housing in the plane of one of the two contacts;

FIG. 4 shows an embodiment of a fusible wire which can be mounted in the circuit board;

FIG. 5 shows an embodiment of a fusible wire carrier which can be plugged into the circuit board; and, FIG. 6 shows a circuit diagram of the protective apparatus of the present invention in connection with a hair drier.

DETAILED DESCRIPTION OF THE DRAWING AND PREFERRED EMBODIMENTS

Figure 1:
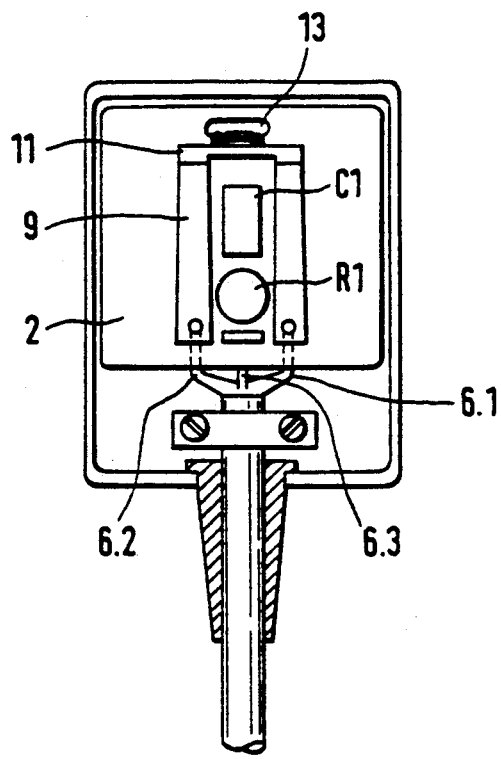
FIGS. 1 and 2 show an angled plug with a protective device, specifically.
Figure 2:
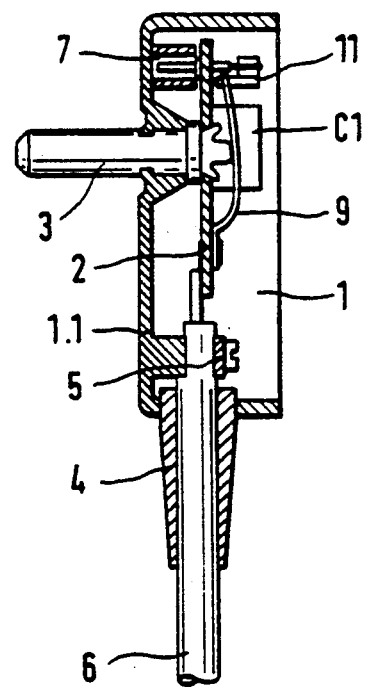

Turning in detail to the drawing figures, FIGS. 1 and 2 show a housing 1 of an angled plug into which a conductor plate or circuit board 2, held by plug pins 3, is inserted. The plug pins are riveted into circuit board 2 below their heads 3.1, and with their notched (e.g., flat or round) shafts 3.2 welded into the base of housing 1.1 by thermal deformation of the fastening sites (see, FIG. 2.)

The two-wire shielded power cord 6 of the equipment (FIG. 6) is inserted into the housing through neckpiece 4 and held in place by clamp 5 (FIG. 2.) Its two wires 6.1 and 6.2 and the shielding 6.3 are connected in a conventional manner at the underside of circuit board 2 with connecting lugs of the firing circuit (FIG. 6.)

The circuit board is made using a printed-circuit board technique and is fitted with circuit elements; the two contacts of protective switch 9 are arranged between these. It can include a stampable material, such as CEM 1 or a high quality phenolic resin impregnated paper having sufficient flexural stiffness (e.g., 2 mm thickness), which is supported by plug pins 3 riveted onto it.

A preferred feature is the method of contacting of the bronze contact springs 9 of the protective switch: The polished heads 3.1 of the plug pins 3 themselves form the opposite contacts, as is taught in U.S. Pat. No. 3,629,766, the relevant portions of which are incorporated herein by reference. In this manner, a special wiring connection between the circuit in the circuit board and plug pins 3 becomes unnecessary. Circuit board 2, with the associated power cord 6 and plug pins 3, is inserted in housing 1, and this is sealed with a water-tight cover.

Figure 3:
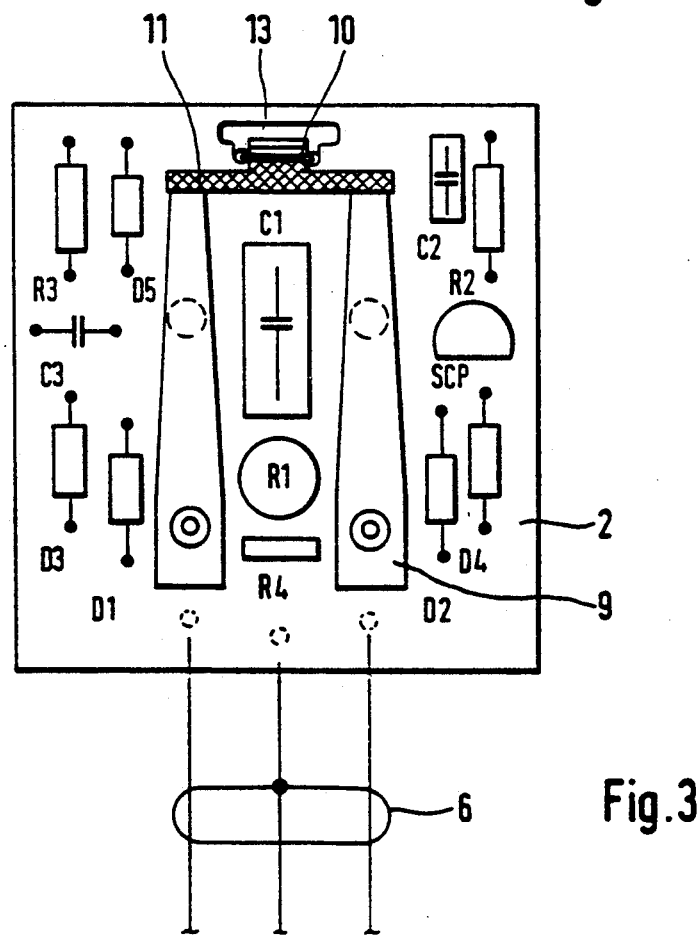
FIG. 3 shows a schematic representation of the design, or pattern, of the circuit board.

The contact pressure in contacts 9 is produced and maintained by a fusible wire 10; this fusible wire is placed in a bow-like manner over a yoke 11 connecting the contact springs and is attached to circuit board 2 (see, FIGS. 1 and 3.) This attachment is constructed, in accordance with the present invention, so that the fusible wire can be exchanged or replaced.

In a first embodiment of the invention, the two ends of the wire are grasped in small brass sockets 12, which have a collar 12.1 (see, FIG. 4.) A hole 13 is stamped out of circuit board 2 underneath yoke 11, with the contour of a double keyhole of a flat C (see, FIG. 3.) The width of the hold in the legs of the C corresponds to the diameter of the sockets and the clearance width of the back of the C to the diameter of the collar. It can be seen from the drawing that the sockets of the ends of the wires can be inserted through hole 13 from above and then pushed into the legs of the C so that their collar 12.1 lies against the circuit board from underneath. At these locations, contact lugs are provided on the underside of the circuit board 2 as outputs of the circuit elements R 1 and SCR of the firing circuit (see, FIG. 6.) The restoring forces of the pre-stressed contact springs arched over the heads of the plug pins produce an assured contact pressure.

In a further embodiment of the invention in accordance with FIG. 5, fusible wire 10 is seated in a cartridge 13 provided with two plug pins 14, similar to the known arrangement, for example, for replaceable needles for disk record players; this cartridge is inserted into contacting holes in circuit board 2. The cartridge assures a better protection while in storage, can be inserted easily without tools, and only the usual needle-punching tool is needed for the circuit board. The cartridge can be injection molded from plastic in simple tools or can be fabricated by bending sheet metal. A press-fit or small indentations on the pins prevents them from being pulled out under the tension of the contact spring forces.

FIG. 6 shows the circuit diagram of the protective device in the plug of a power cord 6 of a piece of equipment G, e.g., a hair dryer. If probe 20 in the equipment detects penetration by water, the firing circuit receives a signal via the shielding 6.3 of power cord 6; this signal fires semiconductor switch SCR, with the result that the current arising in the diagonals of the quartet of diodes D 1-4 instantly melts fusible wire 10. The pre-stressed contact springs of protective switch 9 simultaneously spring back from their bowed position (see, FIG. 2) to thereby suddenly break the line voltage behind plug pins 3.

In a sample embodiment of how the present invention might be constructed, circuit board 2 may have the dimensions 40×38 mm and a thickness of 2 mm, and housing 1 of the angled plug had the dimensions 60×45×25 mm. The housing is suitably closed in a water-tight manner. In the embodiment shown in FIG. 4, the very thin fusible wire (having a diameter of approximately 1 mm) was fastened in sockets 12 to prevent creep, in consideration of the appreciable tensile forces, using an indented connection. The sockets are received by a pocket 7 in the plug housing (as shown, for example, in FIG. 2), in order to prevent them from falling away as loose parts after the wire bow has melted. In the embodiment shown in FIG. 5, such a pocket is superfluous.

While only several embodiments of the present invention have been shown and described, it will be obvious to those of ordinary skill in the art that many modifications may be made to the present invention without departing from the spirit and scope thereof.

What is claimed is:

1. Device for the protection of electrical equipment fed from a power line through a power cord terminating in a plug, comprising:
   a circuit board having a cut-out;
   a fusible wire;
   an automatic-opening mechanical protective switch with two sets of contacts in the power leads of the power cord plug, said sets of contacts having pre-stressed contact springs which are held in closed state with contact rods by said fusible wire;
   an electronic firing circuit having a two-pole output with contact lugs to which said fusible wire is electrically and mechanically connectable;
   said electronic firing circuit being arranged on said circuit board together with said protective switch in a housing for said power cord plug; and,
   said circuit board having said cut-out at said contact lugs into which said fusible wire is mountable with reinforced ends.

2. The device according to claim 1, wherein said fusible wire is bow-shaped.

3. The device according to claim 1, wherein the ends of said fusible wire are held in sockets which are of sufficient length so that they are capable of being grasped for the purpose of mounting.

4. The device according to claim 1, wherein said housing is provided with a pocket underneath the cut-out in said circuit board in order to receive indentations of said fusible wire.

5. The device according to claim 1, wherein said circuit board cut-out is in a shape of a keyhole.

6. The device according to claim 1, wherein said contact lugs are shaped to form bushings into which said fusible wire, with its ends reinforced to form contact pins and held in a cartridge, is insertable.

7. The device according to claim 6, wherein said fusible wire is inserted into said contact lugs by a snap-fit connection.

8. The device according to claim 1, further comprising a housing of an angled plug for said circuit board, said angled plug having plug pins with heads which form opposing contacts of said contact springs of said protective switch.

9. The device according to claim 8, wherein the heads of the plug pins carry said circuit board and their shafts are located into the base of said housing.

10. The device according to claim 9, wherein the shafts are injection molded into the base of said housing.

11. The device according to claim 9, wherein the shafts are welded by thermal deformation into the base of said housing.

12. Device for the protection of electrical equipment fed from a power line through a power cord terminating in a plug, comprising:
- a circuit board;
- a fusible wire wherein ends of said fusible wire are held in sockets which are of sufficient length so that they are capable of being grasped for the purpose of mounting;
- an automatic-opening mechanical protective switch with two sets of contacts in the power leads of the power cord plug, said sets of contacts having pre-stressed contact springs which are held in closed state with contact rods by said fusible wire;
- an electronic firing circuit having a two-pole output with contact lugs to which said fusible wire is electrically and mechanically connectable; and
- said electronic firing circuit being arranged on said circuit board together with said protective switch in a housing for said power cord plug.

13. The device according to claim 12, wherein said fusible wire is bow-shaped.

14. The device according to claim 12, further comprising a housing of an angled plug for said circuit board, said angled plug having plug pins with heads which form opposing contacts of said contact springs of said protective switch.

15. The device according to claim 14, wherein the heads of the plug pins carry said circuit board and their shafts are located into the base of said housing.

16. The device according to claim 15, wherein the shafts are injection molded into the base of said housing.

17. The device according to claim 15, wherein the shafts are welded by thermal deformation into the base of said housing.

18. Device for the protection of electrical equipment fed from a power line through a power cord terminating in a plug, comprising:
- a circuit board;
- a fusible wire;
- an automatic-opening mechanical protective switch with two sets of contacts in the power leads of the power cord plug, said sets of contacts having pre-stressed contact springs which are held in closed state with contact rods by said fusible wire;
- an electronic firing circuit having a two-pole output with contact lugs to which said fusible wire is electrically and mechanically connectable, said electronic firing circuit being arranged on said circuit board together with said protective switch in a housing for said power cord plug; and,
- a housing of an angled plug for said circuit board, said angled plug having plug pins with heads which form opposing contacts of said contact springs of said protective switch, the heads of the plug pins carrying said circuit board in a non-displaceable manner, and their shafts, being located into the base of said housing.

19. The device according to claim 18, wherein the shafts are injection molded into the base of said housing.

20. The device according to claim 18, wherein the shafts are welded by thermal deformation into the base of said housing.

* * * * *